United States Patent
Kolb

(10) Patent No.: US 7,628,055 B2
(45) Date of Patent: Dec. 8, 2009

(54) METHOD OF DETERMINING THE ZERO-CLEARANCE PRESSURE IN A CONTROLLED CLEARANCE PISTON GAUGE

(75) Inventor: Kenneth A. Kolb, Houston, TX (US)

(73) Assignee: General Electric Company, Schenectady, NY (US)

( * ) Notice: Subject to any disclaimer, the term of this patent is extended or adjusted under 35 U.S.C. 154(b) by 239 days.

(21) Appl. No.: 11/778,972

(22) Filed: Jul. 17, 2007

(65) Prior Publication Data

US 2009/0019915 A1    Jan. 22, 2009

(51) Int. Cl.
  *G01L 27/00* (2006.01)
  *G01L 7/16* (2006.01)
(52) U.S. Cl. ......................................... 73/1.68; 73/744
(58) Field of Classification Search .................. 73/1.57, 73/1.65, 1.68, 700, 741–744, 751
  See application file for complete search history.

(56) References Cited

U.S. PATENT DOCUMENTS 1,481,551 A * 1/1924 Hammond et al. .......... 137/224
3,267,719 A * 8/1966 Bowen et al. ................. 73/1.65
3,915,009 A * 10/1975 Worden et al. ................ 73/701
4,760,862 A * 8/1988 Mutou et al. ........... 137/315.05
5,259,235 A * 11/1993 Kolb ........................... 73/1.65

OTHER PUBLICATIONS

"PG7307 Controlled Clearance Piston Gauge Operation and Maintenace Manual", DH Instruments, 2007.*
Donald H. Newhall, "A New High Pressure Technique—The Controlled-Clearance Principle", Dec. 1957.*
Newhall et al., "Recent Studies of Float and Stall Curves in Controlled-Clearance Deadweight Testers with Simple Piston", Review of Science Instruments, vol. 50, No. 8, Aug. 1979.*
Newhall et al., "Revised Characterization of the Controlled Clearance Piston Gauge", Review of Scientific Instruments, vol. 74, No. 5, May 2003.*

(Continued)

*Primary Examiner*—David A. Rogers
(74) *Attorney, Agent, or Firm*—GE Global Patent Operation

(57) ABSTRACT

A method of determining the zero clearance pressure in a controlled clearance piston gauge. The typical method includes pressurizing the cylinder in which the piston resides to a given system pressure. The jacket pressure is then changed and the exhaust gas pressure build-up rate at different jacket pressures is measured. The zero clearance pressure to be where the exhaust gas pressure build-up rate is zero.

12 Claims, 4 Drawing Sheets

OTHER PUBLICATIONS

Johnson et al., "The Piston Gauge as a Precise Pressure-Measuring Instrument", Transactions of the ASME, Apr. 1953.*

J. O. Ess, "Generation of Precise Reference Pressures Up To 15,750 psi", Journal of Basic Engineering, Dec. 1964.*

Johnson et al., "Dead Weight Piston Gauge for Pressures to 26 Kilobars", Review of Scientific Instruments, vol. 38, No. 9, Sep. 1967.*

Jain et al., "Intercomparison of Hydraulic Pressure Measurements to 28 MPa Using a Single-Piston Gauge in the Controlled-Clearance, Reentrant, and Simple Configurations", Review of Scientific Instruments, vol. 63, No. 5, May 1992.*

Molinar et al., "Elastic Distortion Calculations on a Special Piston Gauge (PG27) Up to 28 MPa in Different Operational Modes", Metrologia, No. 30, 1993.*

Newhall, Donald H., "A New High Pressure Technique: The Controlled-Clearance Principle," Industrial and Engineering Chemistry, vol. 49, No. 12:1993-1995 (Dec. 1957).

Jain, K., Ehrlich, C., Houck, J., "Intercomparison of Hydraulic Pressure Measurements to 28 MPa Using a Single-Piston Gauge in the Controlled Clearance, Reentrant, and Simple Configurations," Rev. Sci. Instrum., vol. 63, No. 5:3127-3135 (May 1992).

* cited by examiner

METHOD OF DETERMINING THE ZERO-CLEARANCE PRESSURE IN A CONTROLLED CLEARANCE PISTON GAUGE

FIELD OF THE INVENTION

This subject invention relates to controlled clearance piston gauges.

BACKGROUND OF THE INVENTION

Controlled clearance piston gauges are used as primary pressure standards. See "Intercomparison of Hydraulic Pressure Measurements to 28 MPa Using a Single-Piston Gauge in the Controlled-Clearance, Reentrant, and Simple Configurations", K. Jain et al., Rev. Sci. Instum., Vol. 63, No. 5, May 1992, pp. 3127-3135 incorporated herein by this reference. See also "The Controlled-Clearance Principle", Donald H. Newhall, Industrial and Engineering Chemistry, Vol. 49, No. 12, December 1957, pp. 1993-1995 also incorporated herein by this reference.

A controlled clearance piston gauge includes a piston surrounded by a jacket which can be pressurized to reduce the space between the piston and the cylinder bore until a zero clearance condition is achieved at a jacket pressure called the zero clearance pressure (Pz). The pressure measured by a controlled clearance piston gauge is a function of many parameters including the masses loaded onto the piston and the effective area of the piston which itself is a function of the zero clearance pressure.

The zero clearance pressure, in turn, is typically determined by measuring the rate at which the piston sinks into the cylinder (also called the fall rate) at different jacket pressures. This measurement may involve the use of a capacitance-type displacement or inductive-type transducer. Also, in some cases, particularly for pneumatic piston-cylinder assemblies with highly precise geometries, the sink rates are much too slow to measure the sink rate accurately enough for the purpose of estimating the zero clearance pressure.

SUMMARY OF THE INVENTION

The subject invention features a new method of determining the zero clearance pressure in a controlled clearance piston gauge and a new system for implementing the method. The inventive method is substantially more sensitive and repeatable than the prior sink rate measurement method particularly at the very low flow rates that occur when the jacket pressure is close to the zero clearance pressure and the system pressure is near the low end of the operating range. The method provides a simple and accurate way to substantially improve the capability of determining the zero clearance pressure especially for pneumatic controlled clearance piston gauges.

The subject invention, however, in other embodiments, need not achieve all these objectives and the claims hereof should not be limited to structures or methods capable of achieving these objectives.

The subject invention features a method of determining the zero clearance pressure in a controlled clearance piston gauge. One typical method includes pressurizing the cylinder in which the piston resides to a given system pressure. The jacket pressure is then changed and the exhaust gas pressure build-up rate at different jacket pressures is measured. The zero clearance pressure is where the exhaust gas pressure build-up rate is zero.

In one example, the cubed root of the measured exhaust gas pressure build-up rate is calculated. Then, the linear relationship between the calculated cubed root of the measured exhaust gas pressure build-up rate and jacket pressure is determined. From this relationship, the point at which the clearance pressure is zero can be extrapolated. The method can be repeated at different system pressures and then the relationship between the zero clearance pressure and system pressure can be determined.

The subject invention also features a system for determining the zero clearance pressure in a controlled clearance piston gauge. One typical system includes an exhaust pressure cap fittable to the controlled clearance piston gauge in place of a weight loading table. In one example, there is a port in the cap in communication with the clearance between the piston and its cylinder. There are also some means, in communication with the port, for measuring the exhaust gas pressure build-up rate at different jacket pressures. In one example, the means includes a high resolution pressure indicator connected to the port.

In a controlled clearance piston gauge with a piston in a cylinder surrounded by a variable pressure jacket, the subject invention also features a method comprising fitting an exhaust pressure cap to the controlled clearance piston gauge, pressurizing the cylinder to a system pressure, changing the jacket pressure, measuring the exhaust gas pressure build-up rate at different jacket pressures, and setting the zero clearance pressure to be where the exhaust gas pressure build-up rate is zero.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
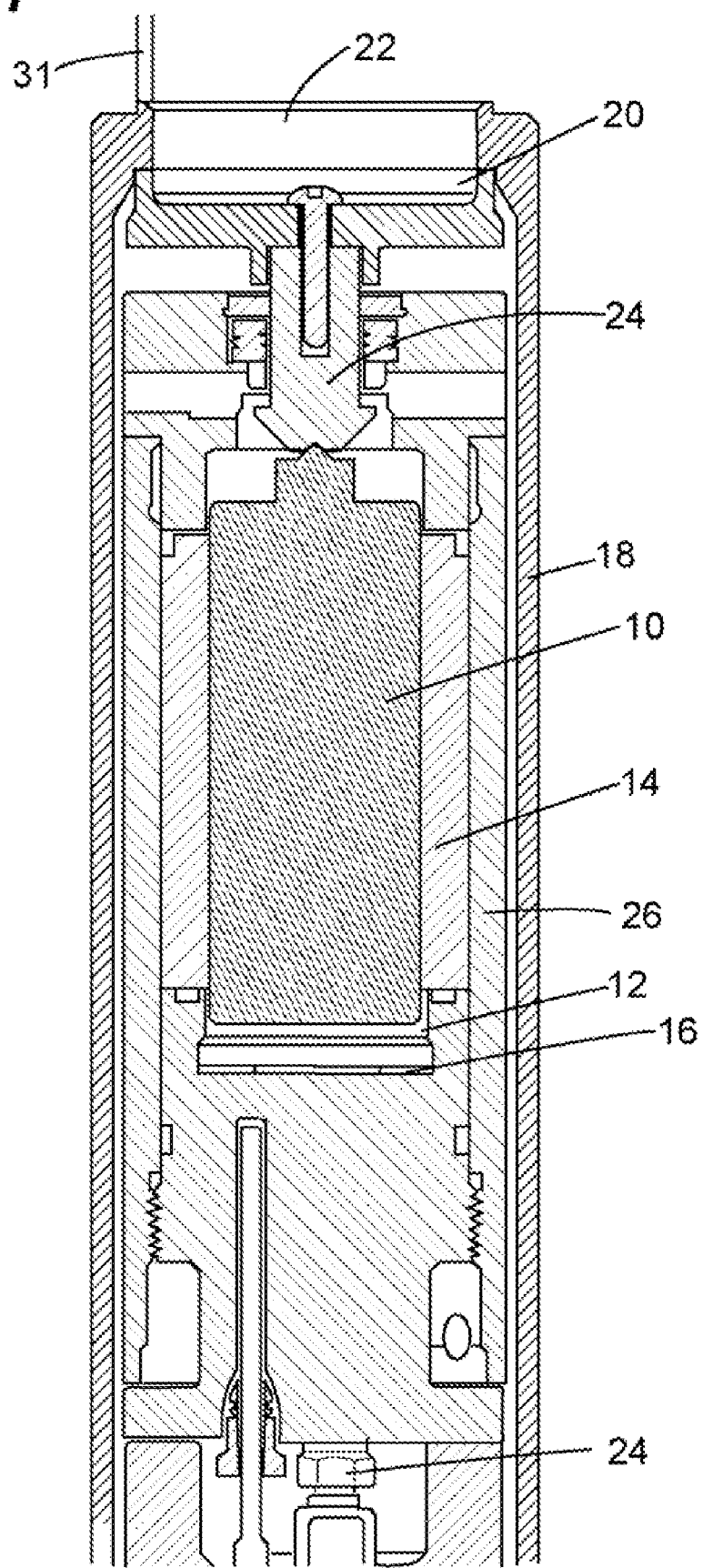
FIG. 1 is a highly schematic cross-sectional view showing the primary components associated with the typical controlled clearance piston gauge.

Aside from the preferred embodiment or embodiments disclosed below, this invention is capable of other embodiments and of being practiced or being carried out in various ways. Thus, it is to be understood that the invention is not limited in its application to the details of construction and the arrangements of components or steps set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows a typical controlled clearance piston gauge with piston 10 in cylinder 14 surrounded by pressurizable pressure jacket 26. Cushion disk 16 is disposed at the bottom of upper cavity 12 of mounting post 45. The gauge also includes outer sleeve weight 18 and a weight loading assembly including table 20, table support 24, and retaining nut 46. Weights (not shown) are added to sleeve weight 18 in a stack. The weights push down on piston 10. The system pressure is supplied to upper cavity 12 of mounting post 45 and the bottom of piston 10 via fitting 24 and jacket pressure is supplied between cylinder 14 and pressure jacket 26 via tube 28, FIG. 2.

As explained in the Background section above, the system pressure measured by the controlled clearance piston gauge is a function of many parameters including the mass of the weights and the effective area of piston 10 which itself is a function of the zero clearance pressure.

The zero clearance pressure, in turn, is typically determined by measuring the rate at which piston 10 sinks into cylinder 14 at different pressures applied between cylinder 14 and pressure jacket 26. This prior art method may involve the use of a capacitance-type or inductive type displacement transducer and in some cases, particularly for a pneumatic piston-cylinder assembly with a highly precise geometry, the sink rates are much too slow to measure the sink rate accurately enough for the purposes of estimating the zero clearance condition.

Figure 2:
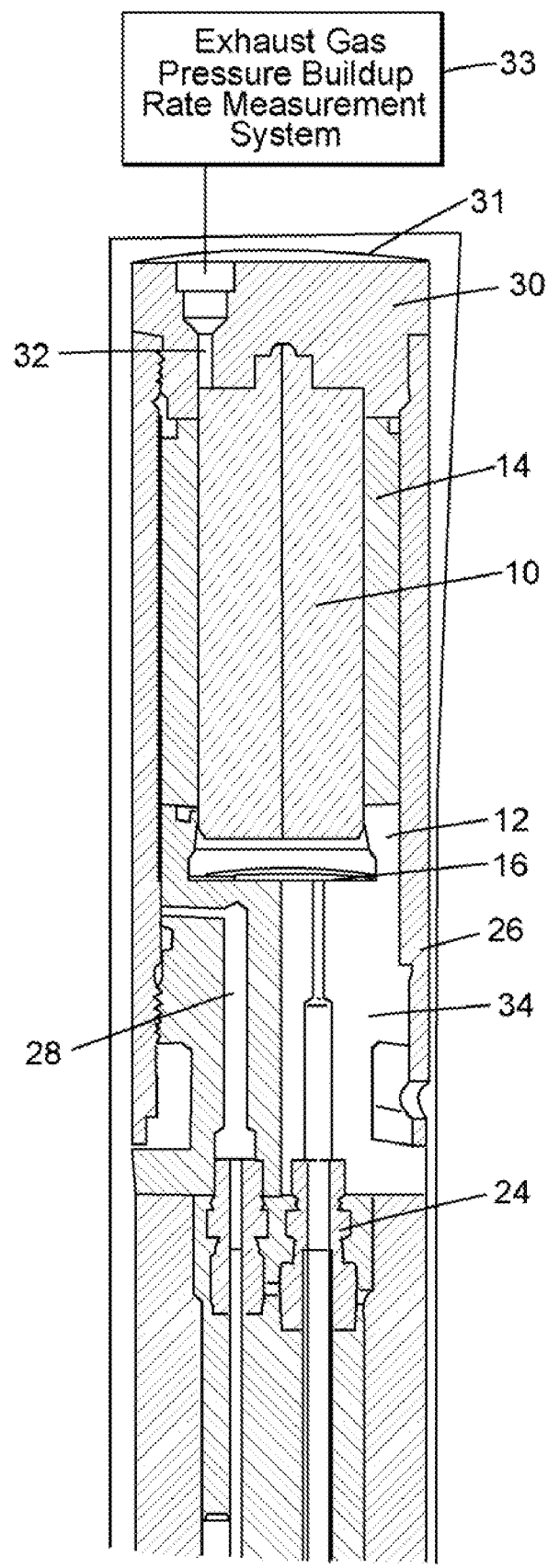
FIG. 2 is a schematic cross-sectional view showing an example of an exhaust pressure cap fitted to a controlled clearance piston gauge in accordance with one example of a system for determining the zero clearance pressure in a controlled clearance piston gauge in accordance with the subject invention.

The invention, in accordance with one example, includes removing sleeve weight 18 and the weight loading table assembly including table 20, table support 24, and retaining nut 46 as shown in FIG. 2. Exhaust pressure cap 30 is threaded into pressure jacket 26 as shown in the place of the weight loading table assembly. Exhaust pressure cap 30 includes feature 31 for fixing piston 10 in place and also includes port 32 in communication with the clearance between piston 10 and cylinder jacket 14. Exhaust gas pressure build-up rate measurement subsystem or means 33, typically including a high resolution pressure indicator such as a quartz bourdon tube pressure indicator, is connected to port 32. Means 33 may also include an appropriately configured (programmed) processor responsive to the pressure indicator.

Using this system, the zero clearance pressure ($P_z$) can be determined as follows. First, upper cavity 12 of mounting post 45 is pressurized to a given system pressure via conduit 34 extending from fitting 24. Next, pressure in the cavity between cylinder 14 and pressure jacket 26 is increased via port 28. At several jacket pressure values, the exhaust gas pressure build-up rate is measure by system 33 via port 32 in pressure cap 30. The zero clearance pressure is determined to be when the exhaust gas pressure build-up rate is zero. This process can then be repeated for different system pressures.

Figure 3:
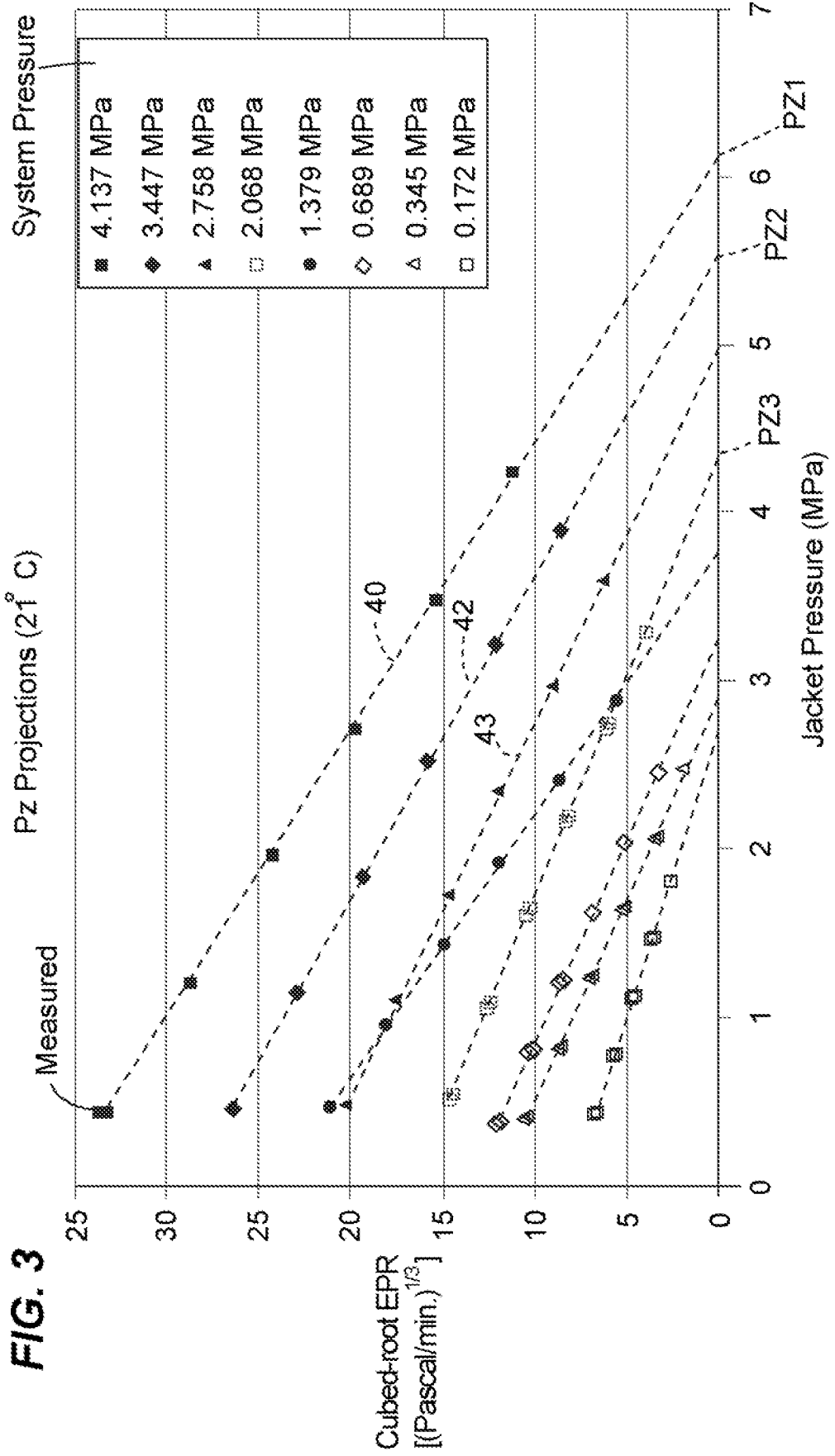
FIG. 3 is a plot showing the relationship between the cubed-root of the measured exhaust gas pressure build-up rate and the jacket pressure for a number of different system pressures in accordance with the subject invention.
Figure 4:
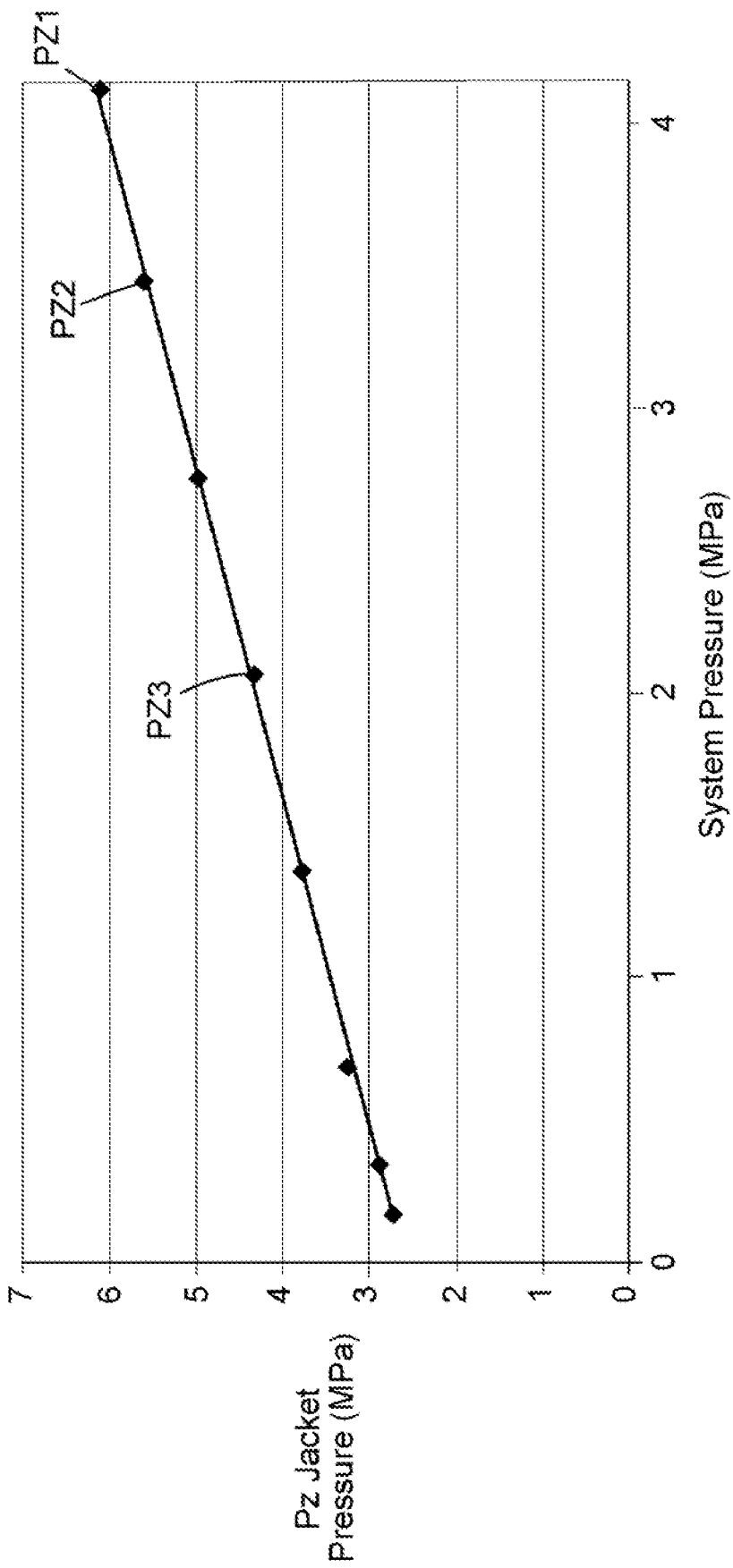
FIG. 4 is a plot showing the relationship between the zero clearance pressure and the system pressure derived from the data of FIG. 3.

FIG. 3 shows that for a system pressure of 4.137 MPa, the cubed root of the measured exhaust gas pressure build-up rate at six jacket pressures resulted in a linear relationship shown by line 40. The zero clearance pressure ($P_{z1}$) for this specific system pressure value is where line 40 intercepts the X axis in FIG. 3. Lines 42-43 and the like show similar results at different system pressures resulting in $P_{z2}$, $P_{z3}$, and additional zero clearance pressures so determined. Then, as shown in FIG. 4, the zero clearance jacket pressure can be plotted as a function of system pressure for a particular controlled clearance piston gauge. The linearity and uniformity of this plot is indicative of the effectiveness of the method of this invention. In this way, the relationship between the jacket pressure and the exhaust gas pressure build up rate yields the zero clearance pressure at each system pressure and, from that information, the relationship between system pressure and the zero clearance pressure can be determined.

The result is a new method of determining the zero clearance pressure in a controlled clearance piston gauge and a new system for implementing the method. Instead of measuring the piston sink rate, the exhaust gas pressure build-up rate is measured. For some of the lower exhaust gas pressure build-up rates, a high accuracy barometer may be used to compensate for small changes in barometric pressure that occur during the measurement period. The method of the subject invention, irrespective of whether or not a pressure cap as shown in FIG. 2 is used, is more sensitive and repeatable than the sink rate method used previously particularly at the very low flow rates that occur when the jacket pressure is close to the zero clearance pressure and the system pressure is near the low end of the operating range of the instrument. The method provides the simple and accurate way to substantially improve the capability of determining the zero clearance pressure for controlled clearance piston gauges. The method of the subject invention, however, is not limited to the use of the pressure cap shown in FIG. 2 as there are other ways, known to those skilled in the art, for detecting the exhaust gas pressure build-up rate.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A method, comprising:
    a) pressurizing a cylinder of a controlled clearance piston gauge in which a piston resides to a predetermined system pressure;
    b) changing a pressure of a jacket surrounding at least a portion of the cylinder;
    c) measuring exhaust gas pressure build-up rate at different jacket pressures; and
    d) setting a zero clearance pressure to be where the exhaust gas pressure build-up rate is zero.

2. The method of claim 1, in which step d) includes calculating the cubed root of the measured exhaust gas pressure build-up rate, determining the linear relationship between the calculated cubed root of the measured exhaust gas pressure build-up rate and jacket pressure, and extrapolating the point at which the clearance pressure is zero.

3. The method of claim 1 further including repeating steps c) and d) at different system pressures.

4. The method of claim 3 further including determining the relationship between the zero clearance pressure and system pressure.

5. A system for determining the zero clearance pressure, the system comprising:
- a controlled clearance piston gauge comprising a piston located within a cylinder and a pressurizable jacket surrounding at least a portion of the cylinder;
- an exhaust pressure cap fittable to the controlled clearance piston gauge in place of a weight loading table;
- a port in the cap in communication with the clearance between the piston and the cylinder; and
- means, in communication with the port, for measuring the exhaust gas pressure build-up rate at different jacket pressures.

6. The system of claim 5 in which said means includes a high resolution pressure indicator connected to the port.

7. A method of setting the zero clearance pressure in a controlled clearance piston gauge having a piston located within a cylinder, a pressurizable jacket surrounding at least a portion of the cylinder the method comprising:
- a) fitting an exhaust pressure cap to the controlled clearance piston gauge;
- b) pressurizing the cylinder to a system pressure;
- c) changing the jacket pressure;
- d) measuring the exhaust gas pressure build-up rate at different jacket pressures; and
- e) setting the zero clearance pressure to be where the exhaust gas pressure build-up rate is zero.

8. The method of claim 7 in which step e) includes calculating the cubed root of the measured exhaust gas pressure build-up rate, determining the relationship between the calculated cubed root of the measured exhaust gas pressure build-up rate and the jacket pressure, and extrapolating the point at which the clearance pressure is zero.

9. The method of claim 7 further including repeating steps c) through e) at different system pressures.

10. The method of claim 9 further including determining the relationship between the zero clearance pressure and the system pressure.

11. The method of claim 7 in which the cap includes a port in communication with the clearance between the piston and the cylinder.

12. The improvement method of claim 11 in which step d) includes using a high resolution pressure indicator connected to the port.

* * * * *